Patented May 4, 1954

2,677,676

UNITED STATES PATENT OFFICE 2,677,676

PREPARATION OF POLYMERS FROM ADIPIC ACID DERIVATIVES

Gordon M. Nichols and Charles J. Albisetti, Wilmington, Del., assignors to E. I. du Pont de Nemours & Company, Wilmington, Del., a corporation of Delaware No Drawing. Application August 11, 1950, Serial No. 178,993

9 Claims. (Cl. 260—78.4)

This invention relates to new polymeric materials and to a method for their preparation.

Polymers of many types are known, and some of them have been found useful in specific applications. The particular uses for which such polymers are suited depend on the particular properties they possess which in turn depend on the particular composition, structure, and molecular weight of the polymer. Polymers having certain composition and structure possess properties making them valuable for some purposes but not for others. Hence, there is a need for new polymers having unusual properties or particular combinations of properties desired in various specific applications.

An object of the present invention is to provide polymers from alpha-methylene delta-substituted adiponitriles and adipates. Another object is to provide a process for the preparation of homopolymers and copolymers of alpha-methylene delta-substituted adiponitriles and adipates. A further object is to provide polymers having the repeating group:

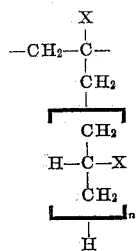

in which X is a cyano or carbalkoxy group and $n$ is 1 or 2. Other objects and advantages of the invention will appear hereinafter.

It has now been found that new polymers having properties desired for various applications are provided by this invention. The products of this invention are polymers of adiponitriles and alkyl esters of adipic acids having a methylene group attached to the alpha-carbon atom of these adipic compounds. Such polymers also having substituent groups attached to the delta-carbon of the alpha-methyleneadiponitrile or -adipate are especially preferred. Copolymers of such alpha-methyleneadipates and -adiponitriles with other polymerizable compounds having an ethylenic double bond are also important embodiments of this invention.

The polymers of this invention are conveniently prepared by contacting a compound of the general formula

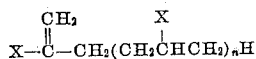

wherein $n$ is 1 or 2 and X is a cyano or carbalkoxy group, e. g., alpha-methylene-delta-methyladiponitrile, either alone or with another polymerizable compound having an ethylenic double bond, e. g., vinyl acetate, in the presence of a vinyl polymerization catalyst at a temperature between 0° C. and the temperature at which the reactants decompose. Temperatures of 0° to about 250° are generally suitable while temperatures of 50° to 150° C. give especially good results. In the preparation of copolymers, the proportions of the alpha-methyleneadipates and -adiponitriles can range from 5% to 99% of the monomer mixture. The polymerization can be carried out at pressures ranging from atmospheric up to 10,000 atm. In most cases the preferred pressure is the autogenous pressure developed by the polymerization system at the operating temperature. The polymerization process can be carried out as a batch, semi-continuous, or continuous operation, the semi-continuous and continuous methods being especially well suited for large-scale operations. The polymerization can also be carried out by bulk, solution or emulsion methods.

The polymers of this invention, made from alpha-methyleneadipates and -adiponitriles having the general formula given in the preceding paragraph, contain recurring structural units of the general formula:

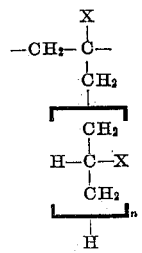

wherein X is a cyano or carbalkoxy group. This novel structural unit of the polymer containing 2 or 3 functional groups, i. e., cyano or carbalkoxy groups as extralinear substituents, imparts unusually desirable properties to the polymer. In particular, the functional group separated from the polymer chain by 3 carbon atoms is more reactive than similar groups joined directly to the polymer chain. For example, polymers in which X is a carbalkoxy are more easily hydrolyzed than polymers containing carbalkoxy attached solely to carbon atoms forming the polymer chain.

The alpha-methylene-delta-substituted adipates and adiponitriles used as starting materials in this invention, can be prepared by heating methacrylonitrile or alkyl esters of methacrylic acid in the liquid phase at a temperature of 160° C. to 400° C. in the presence of a polymerization inhibitor. An especially good method for preparing alpha-methylene-delta-methyladiponitrile is to heat methacrylonitrile in the absence of a polymerization initiator at a temperature of 300° to 400° C. under pressure sufficient to maintain a liquid phase for a period of time not exceeding 15 minutes, as described in S. N. 158,325, filed April 26, 1950, by M. J. Hogsed, now issued as U. S. Patent 2,566,203. Of course, the starting materials are freed of any polymerization inhibitor before being used in the process of this invention.

The invention is further illustrated by the following examples in which the proportions of ingredients are expressed in parts by weight unless otherwise specified.

*Example 1.*—A mixture of 40 parts of dimethyl alpha-methylene-delta-methyladipate and 1 part of benzoyl peroxide is placed in a glass reaction vessel, the air in the vessel removed by evacuation, followed by flushing with nitrogen. The reaction mixture is maintained under an atmosphere of nitrogen and heated at 75-80° C. for 22 hours. At this time the reaction mixture is a viscous syrup. An additional 1 part of benzoyl peroxide is added and the heating continued at 75-80° C. for 96 hours more. The resulting polymer of dimethyl alpha-methylene-delta-methyladipate is a clear solid at room temperature. The infrared spectrum of this polymer is not the same as that of a polymethyl methacrylate prepared by conventional polymerization of methyl methacrylate. Although some of the bands of both polymers are the same, the polymer of this example does not agree at the 9.5 micron, 11.0 micron, 12.0 micron, 12.3 micron, 13.3 micron, and 14.0 micron bands.

Five parts of the polymer of Example 1 is heated at reflux temperature for 16 hours in 10% aqueous potassium hydroxide solution. The reaction mixture is filtered and the filtrate is acidified, whereupon a sticky polymer separates, which, after drying, amounts to 1.5 parts. The treatment of a sample of conventional polymethyl methacrylate in a similar manner gives no solid organic acid after acidification of the filtrate. These results indicate that the polymer of Example 1 contains ester groups which are more readily hydrolyzed than those in ordinary polymethyl methacrylate.

Ten parts of the polymer of dimethyl alpha-methylene-delta-methyladipate of Example 1 is placed in a reaction vessel fitted with a short fractionating column and heated in a metal (lead) bath. On heating the reaction mixture to 400° C., there is obtained 3 parts of a liquid distillate having a boiling point of 150-200° C. The reactor contains a residue of 4.5 parts. On the other hand, 10 parts of polymethyl methacrylate heated in the same way yields 8 parts of methyl methacrylate monomer, B. P. 100° C., and only 0.6 part of residue remains in the reaction vessel.

*Example 2.*—A glass reaction vessel is charged with 20 parts of dimethyl alpha-methylene-delta-methyl-adipate (0.1 mole), 9.8 parts of maleic anhydride (0.1 mole) and 0.2 part of alpha, alpha'-azobis(alpha,gamma - dimethyl - valeronitrile). After flushing out the reaction vessel as in Example 1, the reaction mixture is maintained at 55-60° C. under an atmosphere of nitrogen. After 24 hours at this temperature another 0.2 part of alpha,alpha'-azobis(alpha,gamma-dimethylvaleronitrile) is added to the viscous reaction mixture. Heating is continued for another 52 hours, and at the end of this time a clear polymer is formed which is nearly solid at room temperature. This copolymer of dimethyl alpha-methylene-delta-methyladipate with maleic anhydride is soluble in acetone and is precipitated from acetone solution by ether.

*Example 3.*—A reaction vessel capable of withstanding high pressure is charged with 15 parts of dimethyl alpha - methylene - delta - methyladipate, 100 parts of benzene, 0.05 part of di-(tertiary-butyl) peroxide, the free space in the reactor swept out with nitrogen, ethylene introduced and the mixture heated 5 hours at 126-131° C. under 900-1000 atm. ethylene pressure. There is obtained a yield of 17.7 parts of a copolymer of dimethyl alpha-methylene-delta-methyladipate and ethylene. This copolymer is a gummy solid having an inherent viscosity of 0.53, measured at 0.125% concentration in xylene. The copolymer contains 10.58% oxygen, which indicates that the copolymer contains 33% dimethyl alpha - methylene - delta-methyladipate and 67% ethylene. This corresponds to a 39% conversion of the alpha - methylene - delta - methyladipate to polymer. This polymer forms a tacky, nearly clear film when the polymer is pressed at 110° C.

*Example 4.*—A stainless steel reaction vessel capable of withstanding high pressure is charged with 30 parts of dimethyl alpha-methylene-delta-methyladipate, 90 parts of vinyl chloride, 2 parts of alpha,alpha'-azodiisobutyronitrile, 132 parts of benzene (thiophene free) and 4 parts of tertiary-butyl alcohol. The reaction vessel is closed and heated at 60° C. for 18 hours under the autogenous pressure developed by the reaction mixture. The resulting reaction mixture is poured into excess methanol to coagulate the polymer. The polymer is filtered, redissolved in acetone, and reprecipitated in methanol. After drying 16 hours in a desiccator at 0.5 mm. pressure, there is obtained 7.5 parts of a white, solid copolymer of dimethyl alpha-methylene-delta-methyladipate and vinyl chloride. Chlorine analysis (22.8%) indicates this copolymer to contain 40.1% vinyl chloride.

*Example 5.*—A glass reaction vessel capable of withstanding superatmospheric pressure is charged with 10 parts of dimethyl alpha-methylene-delta-methyladipate, 90 parts of vinyl acetate, 100 parts of tertiary-butyl alcohol and 0.2 part of alpha,alpha'-azodiisobutyronitrile. The air in the reactor is swept out with nitrogen, the reactor closed and tumbled in a water bath maintained at 70° C. for 24 hours. The reaction mixture is under the autogenous pressure developed under the reaction conditions. The polymer is isolated by pouring the resulting polymer solution into about 640 parts of cold petroleum ether, the petroleum ether decanted, and the precipitate dried at 150° C. under a pressure of 1-2 mm. of mercury. There is obtained 87.2 parts of a copolymer of dimethyl alpha-methylene-delta-methyladipate and vinyl acetate, corresponding to a conversion of 87.2%, having an inherent viscosity, determined at 25° C. in 0.1% solution in chloroform, of 1.35.

*Example 6.*—A mixture of 10 parts of dimethyl alpha - methylene - delta - (3 - carbomethoxybutyl) adipate and 0.5 part of benzoyl peroxide is polymerized by the process of Example 1 at 80° C. for 12 days. The resulting homopolymer is a very viscous syrup having a refractive index of 1.4752 (the refractive index of the original mixture is 1.4630).

*Example 7.*—A solution of 26 parts of dimethyl alpha - methylene - delta - (3 - carbomethoxybutyl) adipate, 104 parts of vinyl acetate, and 2.6 parts of alpha,alpha'-azodiisobutyronitrile in 130 parts of tertiary-butyl alcohol is placed in a reaction vessel fitted with a reflux condenser and heated at reflux temperature for 6 hours. The resulting reaction mixture is poured into about 640 parts of cold petroleum ether, the petroleum ether decanted, and the precipitate dried at 150° C. under 1–2 mm. pressure, yielding 75 parts of dry polymer. This copolymer of alpha-methylene-delta-(3-carbomethoxybutyl) adipate and vinyl acetate has the following properties: inherent viscosity, measured in 0.5% solution in chloroform at 25° C., 0.14; saponification No. 574, 581; methoxyl content, 7.60%, 7.47%; is a slightly tacky white solid.

*Example 8.*—A mixture of 9.32 parts of alpha-methylene - delta - methyladiponitrile and 0.17 part of benzoyl peroxide is placed in a lead tube and subjected to a pressure of 7,700–6,400 atm. for about 12 hours at 100° C. in apparatus of the type described by P. W. Bridgman in "The Physics of High Pressures," Macmillan Co., 1931, on pages 41–48. The product is a clear, solid, amber polymer of alpha - methylene - delta-methyladiponitrile, obtained in 100% conversion. This polymer is insoluble in dioxane, benzene, chloroform, xylene, and methanol. Acetone, dimethylformamide, and acetonitrile swell the polymer. Films are formed by molding the polymer at 190° C. under 30,000 lb./sq. in. pressure.

*Example 9.*—A reaction vessel fitted with a reflux condenser, stirrer, thermometer and nitrogen inlet tube is charged with 50 parts of dimethyl alpha - methylene - delta(3 - carbomethoxybutyl) adipate, 10 parts of acrolein, 7.2 parts of a 25%, by weight, solution of acetyl peroxide in dimethyl phthalate, 170 parts of n-propyl alcohol and 170 parts of dioxane. The reaction mixture is blanketed with nitrogen and heated at 60° C. for 68 hours. By evaporation of the solvent from the reaction mixture there is obtained 29.4 parts of a colorless low molecular weight copolymer of alpha-methylene-delta-(3-carbomethoxybutyl) adipate and acrolein.

*Example 10.*—A solution consisting of 75 parts of chloroprene (2-chloro-1,3-butadiene), 25 parts of alpha - methylene - delta - methyladiponitrile, 4.0 parts of Nancy wood rosin and 0.34 part of dodecyl mercaptan is emulsified at room temperature in a solution consisting of 157 parts of water, 0.95 part of sodium hydroxide, 0.60 part of a formaldehyde/sodium naphthalene sulfonate condensation product, and 0.60 part of potassium persulfate. The emulsion is stirred slowly and heated under a blanket of nitrogen to a temperature of 40° C. After 18 minutes at this temperature, polymerization starts as evidenced by a rise in the temperature of the emulsion. The polymerization is continued for 4.2 hours at 40–43° C. During this time the specific gravity of the polymer latex rises to 1.045. The polymerization is stopped at this point by the addition of 13 parts of an emulsion prepared by emulsifying a solution consisting of 0.4 part of phenothiazine, 0.4 parts of p-tertiary-butyl-catechol, and 70.4 parts of benzene in a solution containing 120 parts of water, 1.2 parts of the sodium salt of the sulfate of technical lauryl alcohol, and 0.6 part of the formaldehyde/sodium naphthalene sulfonate condensation product mentioned above. Twenty-six and one-tenth parts of the polymer latex is poured into 158 parts of ethanol to coagulate the polymer. There is obtained 6.24 parts, corresponding to 62% conversion, of colorless elastic copolymer of alpha-methylene-delta-methyladiponitrile and chloroprene. The product contains 3.2% nitrogen, which indicates that the copolymer contains 10.5 mole percent alpha-methylene-delta-methyladiponitrile. The copolymer is soluble in benzene and chloroform.

The examples have illustrated this invention by reference to homopolymers of alpha-methyleneadiponitriles and alkyl alpha-methyleneadipates and by reference to specific copolymers of these alpha-methyleneadipates and -adiponitriles with certain polymerizable unsaturated compounds. However, this invention includes copolymers of alpha-methyleneadipontriles and alkyl alpha-methyleneadipates with any unsaturated compound having an ethylenic double bond which, in accordance with the present state of the art, is recognized as being capable of undergoing polymerization reactions involving addition across the ethylenic bond, which reaction is catalyzed by free radical-generating initiators. Unsaturated compounds of this type, which can be copolymerized with alpha-methylene-adiponitriles and -adipates, include aliphatic monoolefins, e. g., ethylene, propylene, isobutylene; aliphatic diolefins, e. g., butadiene; vinyl and vinylidene halides, e. g., vinyl fluoride, vinylidene fluoride, vinyl chloride and vinylidene chloride; vinyl esters of organic acids, e. g., vinyl propionate, vinyl benzoate, vinyl acetate, vinyl isobutyrate, and vinyl laurate; vinyl ketones, e. g., methyl vinyl ketone and methyl isopropenylketone; acrylic and methacrylic acids and their derivatives such as esters, nitriles, and anhydrides, e. g., ethyl acrylate, methyl methacrylate, acrylonitrile, methacrylonitrile and acrylic acid; butenedioic acids and their derivatives, e. g., maleic and fumaric acids, their esters, nitriles, and anhydrides; substituted ethylenes such as trifluoroethylene, chlorotrifluoroethylene, tetrafluoroethylene, and styrene. Combinations of two or more of these unsaturated compounds are also useful for copolymerization with the alpha-methylene substituted adiponitriles or adipates. A particular mixture of unsaturated compounds which gives good results is a mixture of ethylene and sulfur dioxide with alpha-methylene-delta-methyladiponitrile.

In addition to the specific initiators mentioned in the examples, any conventional vinyl polymerization initiator capable of generating free radicals under the operating conditions can be used to prepare the polymers of this invention. Such compounds generate free radicals by thermal or photodecomposition under the polymerization conditions. Free radical-generating initiators which are especially useful include organic peroxy compounds and organic azo compounds. Specific peroxy compounds which are operable include the dialkyl peroxides, e. g., di(tertiary-butyl) peroxide and diethyl peroxide; diacyl peroxides, e. g., diacetyl peroxide, dibenzoyl peroxide and dilauroyl peroxide; dicarbonyl peroxides, e. g., dibenzal peroxide and methyl ethyl ketone peroxide; hydroperoxides such as tertiary-butyl hydroperoxide and cyclohexyl hydroperoxide; and the per acids, e. g., peracetic acid, perbenzoic acid, and perphthalic acid. Organic azo compounds which are useful polymerization initiators include those wherein the azo group is acyclic, and is bonded from both of the nitrogens to carbons which are aliphatic in character and at least one which carbons are tertiary such as described in U. S. Patent 2,471,959 to M. Hunt. Specific examples of suitable azo initiators include alpha,alpha'-azodiisobutyronitrile, 1,1'-azodicyclohexanecarbonitrile, dimethyl alpha,alpha'-azodiisobutyrate, alpha,-alpha'-azodiisobutyramide and alpha(carbamylazo)isobutyronitrile.

The concentration of polymerization initiator employed in the process of this invention varies over wide limits. Amounts of free radical-generating initiators ranging from 0.01 to 10% of the weight of the unsaturated compounds being polymerized are operable. Especially suitable results are obtained with concentrations of from 0.1 to 5% of the unsaturated monomers.

The examples have illustrated the use of certain specific solvents in solution type polymerizations. However, other inert liquids can be used for this purpose. Suitable solvents include hydrocarbons such as benzene, toluene, xylene, cyclohexane, and decahydronaphthalene; ethers such as diethyl ether and dioxane; and alcohols such as ethyl, isopropyl, and tertiary-butyl alcohols.

The polymers of this invention have a variety of properties, which makes them of particular value in various applications. They are useful for the manufacture of films, fibers, coating compositions, and adhesives. The copolymers of dimethyl alpha-methylene-delta-methyladipate with vinyl acetate are particularly well suited for use in the manufacture of films because of their toughness and pliability. Another specific type of copolymer which is particularly useful is the copolymer of alpha-methylene-delta-methyladiponitrile with chloroprene. Copolymers of this particular type have especially good freeze resistance and oil resistance. These properties make them of considerable value for use in applications requiring films or other shaped objects having good low temperature properties and good resistance to oil.

We claim:

1. A process of preparing polymeric compounds which comprises heating a compound having the general formula:

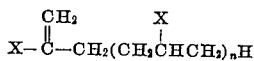

wherein $n$ is a positive whole integer not greater than 2, X is of the group consisting of cyano and carbalkoxy groups and the X groups are similar in the presence of a vinyl free radical polymerization initiator.

2. A process of preparing polymeric compounds which comprises heating a compound having the general formula:

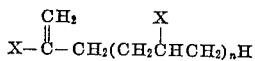

wherein $n$ is a positive whole integer not greater than 2, X is of the group consisting of cyano and carbalkoxy groups and the X groups are similar in the presence of 5 to 99% by weight of an unsaturated compound having an ethylenic polymerizable double bond and a vinyl free radical polymerization initiator.

3. A process of preparing polymeric compounds which comprises heating a compound having the general formula:

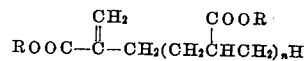

wherein $n$ is a positive whole integer not greater than 2 and R is a hydrocarbon group in the presence of an unsaturated compound having an ethylenic double bond and a vinyl free radical polymerization catalyst.

4. A process of preparing polymeric compounds which comprises heating a compound having the general formula:

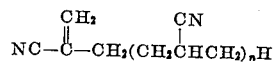

wherein $n$ is a positive whole integer not greater than 2 in the presence of an unsaturated compound having an ethylenic double bond and a vinyl free radical polymerization catalyst.

5. A process of preparing polymeric alpha-methylene-delta-substituted adiponitriles, which comprises heating a compound having the general formula:

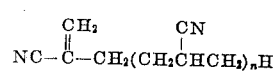

wherein $n$ is a positive whole integer not greater than 2 in the presence of a vinyl free radical polymerization initiator.

6. A process of preparing polymeric alpha-methylene-delta-substituted adipates, which comprises heating a compound having the general formula:

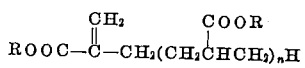

wherein $n$ is a positive whole integer not greater than 2 and R is a hydrocarbon group in the presence of a vinyl free radical polymerization initiator.

7. A product produced in accord with the process of claim 1.

8. A product produced in accord with the process of claim 3.

9. A product produced in accord with the process of claim 4.

References Cited in the file of this patent

UNITED STATES PATENTS

| Number | Name | Date |
|---|---|---|
| 1,980,483 | Hill | Nov. 13, 1934 |
| 2,232,785 | Howk | Feb. 25, 1941 |
| 2,244,487 | Crawford | June 3, 1941 |
| 2,244,645 | Jacobson | June 3, 1941 |
| 2,566,203 | Hogsed | Aug. 28, 1951 |